US012687828B2

(12) United States Patent
von Haugwitz et al.

(10) Patent No.: US 12,687,828 B2
(45) Date of Patent: Jul. 21, 2026

(54) PROCESS DATA EXCHANGE WITH GUARANTEED MINIMUM TRANSMISSION INTERVALS

(71) Applicant: Pilz GmbH & Co. KG, Ostfildern (DE)

(72) Inventors: Frank von Haugwitz, Ostfildern (DE); Christian Adams, Ostfildern (DE); Stefan Wöhrle, Ostfildern (DE)

(73) Assignee: Pilz GmbH & Co. KG, Ostfildern (DE)

( * ) Notice: Subject to any disclaimer, the term of this patent is extended or adjusted under 35 U.S.C. 154(b) by 777 days.

(21) Appl. No.: 18/157,516

(22) Filed: Jan. 20, 2023

(65) Prior Publication Data
US 2023/0236558 A1     Jul. 27, 2023

(30) Foreign Application Priority Data

Jan. 21, 2022    (DE) ......................... 102022101436.3

(51) Int. Cl.
*G05B 15/02*     (2006.01)
*G05B 9/02*     (2006.01)
*G05B 19/042*     (2006.01)

(52) U.S. Cl.
CPC .................................. *G05B 15/02* (2013.01)

(58) Field of Classification Search
CPC ..................................................... G05B 15/02
See application file for complete search history.

(56) References Cited

U.S. PATENT DOCUMENTS

2013/0113304 A1* 5/2013 Pullmann ............. H01H 47/005
                                                              307/326
2019/0056723 A1* 2/2019 Dehaas ............... G06F 13/4068
                          (Continued)

FOREIGN PATENT DOCUMENTS

EP          1086408 B1     1/2003
JP      2012068856 A     4/2012
                  (Continued)

OTHER PUBLICATIONS

Japanese Office Action for JP2023001654 dated Apr. 22, 2024, 7 pages.

*Primary Examiner* — Oleg Survillo
(74) *Attorney, Agent, or Firm* — Miller Johnson

(57)     ABSTRACT
A control device includes first and second control modules. The first control module is configured to generate process data at $t_1$, send the process data to the second control module via a communication channel, receive a response to the process data, and process the process data at $t_4$. The second control module is configured to receive the process data from the first control module, process the process data at $t_2$, generate the response at $t_3$, and send the response to the first control module. The times $t_1$, $t_2$, $t_3$, and $t_4$ are in chronological order. In various implementations, the first and second control modules jointly guarantee a minimum duration $\Delta 1$ between $t_1$ and $t_2$. In various implementations, the second control module guarantees a minimum duration $\Delta 2$ between $t_2$ and $t_3$. In various implementations, the first and second control modules jointly guarantee a minimum duration $\Delta 3$ between $t_3$ and $t_4$.

14 Claims, 7 Drawing Sheets

(56)           References Cited

U.S. PATENT DOCUMENTS

| | | |
|---|---|---|
| 2021/0022037 A1 | 1/2021 | Bhutani |
| 2022/0350706 A1* | 11/2022 | Nakaide .............. G06F 11/2038 |
| 2022/0382235 A1* | 12/2022 | Maruyama ......... G05B 19/0423 |
| 2022/0402121 A1* | 12/2022 | Kogan ................... B25J 9/1674 |
| 2023/0397222 A1* | 12/2023 | Fu ..................... H04L 27/26025 |
| 2024/0134354 A1* | 4/2024 | Gau ..................... G05B 19/418 |
| 2024/0430979 A1* | 12/2024 | Pradas ................. H04W 76/28 |
| 2025/0031272 A1* | 1/2025 | Zhang ................. H04W 76/28 |
| 2025/0056654 A1* | 2/2025 | Pradas ................. H04W 76/28 |

FOREIGN PATENT DOCUMENTS

| | | |
|---|---|---|
| JP | 2021068200 A | 4/2021 |
| WO | 9964938 A1 | 12/1999 |
| WO | 2019034928 A1 | 2/2019 |

\* cited by examiner

PROCESS DATA EXCHANGE WITH GUARANTEED MINIMUM TRANSMISSION INTERVALS

CROSS-REFERENCE TO RELATED APPLICATIONS

This application claims priority to German Application No. 10 2022 101 436.3 filed Jan. 21, 2022. The entire disclosure of the application referenced above is incorporated by reference.

FIELD

The present disclosure relates to control of an automated system and more particularly to controlling an automated system by exchanging process data via a communication channel.

BACKGROUND

Control devices are generally known in the field of automation technology. Their task is to control and regulate technical systems. Technical systems can be machines or processes. A control device is called modular if it is made up of individual components, each of which fulfills different tasks. The individual components are also referred to as control modules, which are combined to form a unit in a housing or housing frame. Generally, such a unit has at least one head module as the central processing unit and one or more modules for connection to the periphery of the technical system. The latter may be called input/output (I/O) modules.

The input modules acquire states of the technical system by acquiring signals from sensors or input devices that are attached to inputs of the modules. The central processing unit evaluates the acquired input signals and, depending on the input signals and the desired control or regulation task, generates output signals that are output via the output modules. Via the output signals, actuators are controlled causing the desired reaction of the technical system.

Special control devices are safe control devices, also called safety controllers or failsafe (FS) controllers. These controllers fulfill the same functions as normal control devices but differ in that they can additionally perform safety-related tasks. The safety-related tasks may lead to safety-related reactions of the technical system. For this purpose, safety controllers comprise internally additional hardware and software that enable the execution of a safety-related function. Safety-related functions ensure safe operation of the technical system in accordance with the relevant standards for machine safety, in particular EN 61508, EN 62061 and/or ISO 13849-1.

An essential quality criterion for a safe control device is its reaction time. The reaction time refers to the time required from the detection of a safety-relevant event to the execution of a corresponding safety-oriented reaction. The reaction time thus describes, for example, the time span between the actuation of an emergency stop button and the resulting shutdown of a dangerous drive. The shorter the reaction time, the higher the quality of a safe control device. When calculating the reaction time, the most unfavorable temporal behavior is to be assumed. Hereby, communication between the modules plays a decisive role.

For communication, individual modules of the control device are linked together via a communication channel, whereby specific requirements have to be met to provide fail-safe communication (FS communication). The specific requirements for fail-safe communication, however, may have an adverse effect on the reaction time. For example, for fail-safe communication, the data to be transmitted is regularly transmitted redundantly to increase the insensitivity of fail-safe communications to electromagnetic interference. Redundant transmission, however, cannot ensure any time characteristics. For calculating the reaction time of a safety function, the most unfavorable time behavior has to be assumed. Redundant transmission therefore leads to longer response times, since the required time for the redundant second transmission has to be taken into account.

One way to improve the response time of a safe control system is to have the communication take place via a communication channel specially designed for safe communication. Furthermore, it is an option to provide safely synchronized clocks of the individual control modules so that a defined time characteristic can be guaranteed within and between the modules. However, both options involve considerable effort and are expensive to implement.

SUMMARY

It is an object to provide a control device and method that allow a more favorable consideration of a response time in a worst-case analysis. Furthermore, it is an object to provide a control device and method that allow a more favorable consideration of the response time in a worst-case analysis without using fail-safe communication devices or fail-safe synchronized clocks.

According to an aspect of the present disclosure, there is provided a control device for controlling an automated system, comprising: a first control module; a second control module; and a communication channel via which the first control module and the second control module exchange process data of the automated system; the control device having the following features: the first control module is configured to generate process data at a first time $t_1$, send the process data to the second control module via the communication channel, receive a response to the process data from the second control module, and process the process data at a fourth time $t_4$; the second control module is configured to receive the process data from the first control module, process the process data at a second time $t_2$, generate the response at a third time $t_3$, and send the response to the first control module; the times $t_1$, $t_2$, $t_3$, and $t_4$ are in chronological order, wherein the control device further comprises at least one of the following features: (i) the first control module and the second control module are jointly configured to guarantee a first minimum duration $\Delta 1$ between the first time $t_1$ and the second time $t_2$; (ii) the second control module is configured to guarantee a second minimum duration $\Delta 2$ between the second time $t_2$ and the third time $t_3$; (iii) the first control module and the second control module are jointly configured to guarantee a third minimum duration $\Delta 3$ between the third time $t_3$ and the fourth time $t_4$.

According to another aspect of the present disclosure, there is provided a control device for controlling an automated system, comprising: a first control module; a second control module; and a communication channel via which the first control module and the second control module exchange process data of the automated system; the control device having the following features: the first control module is configured to generate process data at a first time $t_1$, send the process data to the second control module via the communication channel, receive a response to the process data from the second control module, and process the process data at a fourth time $t_4$; the second control module is configured to receive the process data from the first control module, process the process data at a second time $t_2$, generate the response at a third time $t_3$, and send the response to the first control module; the times $t_1$, $t_2$, $t_3$, and $t_4$ are in chronological order; the first control module processes the process data according to a first local cycle; the first control module sends a first instance and at least a second instance of the process data to the second control module within the first local cycle.

According to another aspect of the present disclosure, there is provided a method for controlling an automated system, comprising the following features: a communication channel connects a first control module and a second control module for exchanging process data of the automated system; the first control module creates process data at a first time $t_1$, sends it to the second control module via the communication channel, receives a response to the process data from the second control module, and processes it at a fourth time $t_4$; the second control module receives the process data from the first control module, processes it at a second time $t_2$, creates the response at a third time $t_3$, and sends it to the first control module; the times $t_1$, $t_2$, $t_3$, and $t_4$ are in chronological order; the method further comprising at least one of the following: (i) the first control module and the second control module jointly guarantee a first minimum duration $\Delta 1$ between the first time $t_1$ and the second time $t_2$; (ii) the second control module guarantees a second minimum duration $\Delta 2$ between the second time $t_2$ and the third time $t_3$; (iii) the first control module and the second control module jointly guarantee a third minimum duration $\Delta 3$ between the third time $t_3$ and the fourth time $t_4$.

According to another aspect of the present disclosure, there is provided a method for controlling an automated system, comprising the following features: a communication channel connects a first control module and a second control module for exchanging process data of the automated system; the first control module creates process data at a first time $t_1$, sends it to the second control module via the communication channel, receives a response to the process data from the second control module, and processes it at a fourth time $t_4$; the second control module receives the process data from the first control module, processes it at a second time $t_2$, creates the response at a third time $t_3$, and sends it to the first control module; the times $t_1$, $t_2$, $t_3$, and $t_4$ are in chronological order; the first control module processes the process data according to a first local cycle; and the first control module sends a first instance and at least a second instance of the process data to the second control module within the first local cycle.

Thus, it is an idea of the present invention to configure control modules of a control device in a way that they can ensure certain minimum durations between selected events when communicating with each other. That is, the control modules can guarantee a predetermined minimum time interval between two events. It could be shown that by specifying these minimum intervals an actual response time cannot be reduced but the ensured time characteristics positively influences the calculation of the worst-case temporal behavior (worst-case analysis).

Without defining the minimum time intervals, there is no functionally safe guaranteed time interval smaller than the total round-trip time of the process data from the sender via the receiver back to the sender. Specifying the minimum time intervals, on the other hand, guarantees certain time characteristics in the round-trip of the process data that can be taken into account in the worst-case analysis and lead to a better assumption than the total round-trip time.

The events between which the control modules guarantee the minimum time interval are selected in such a way that a control module can either guarantee the minimum interval alone or two control modules can guarantee the interval together without being synchronized in time for this purpose. Both variants thus do not require functionally safe synchronization between the modules. Likewise, both variants do not require any additional hardware equipment but can be implemented entirely in software. An improved worst-case analysis can thus be realized by devices that are implemented in a simple and cost-effective manner, or by retrofitted systems.

According to a further refinement, the control device has the following further feature: The first control module and the second control module guarantee the first minimum duration $\Delta 1$ and/or the third minimum duration $\Delta 3$ by redundantly transmitting the process data and by ensuring specific time characteristics.

According to this embodiment, the control modules communicate with each other by transmitting the process data redundantly. Furthermore, in addition to the redundant transmission, a specific time characteristic of the redundant transmission is guaranteed by the respective modules. In this way, a minimum time interval between the creation and the processing of the process data on the two different control modules can easily be ensured.

According to a further refinement, the control device has the following further features: The first control module transmits the process data redundantly by moving a first instance of the process data to a transmit buffer of the communication channel at a point of time $t_a$ and by shifting a second instance of the process data to the transmit buffer of the communication channel at a point of time $t_b$; and the first control module ensures the time characteristics by starting a time monitoring that determines a time interval between the points of time $t_a$ and $t_b$ and by shifting the second instance of the process data into the transmit buffer only if the time interval exceeds a defined minimum value.

According to this refinement, the first control module ensures a minimum time interval between sending a first instance of the process data and sending a second instance of the process data by monitoring the time interval by means of time monitoring and sending the second instance of the process data only when the minimum time interval has been met. Thereby, the first control module, in interaction with a correspondingly designed second control module, can guarantee a minimum time interval (minimum duration $\Delta 1$ or $\Delta 3$) between creation of the process data and processing of the process data on different control modules, wherein functionally safe synchronization of the different control modules is not required.

It is understood that the second control module can also be designed analogously if it is the transmitter of the process data. Therefore, according to a further refinement, the control device may have the following further features: The second control module transmits the response to the process data redundantly by shifting a first instance of the response into a transmit buffer of the communication channel at a point of time $t_a$ and by shifting a second instance of the response into the transmit buffer of the communication channel at a point of time $t_b$; and the second control module ensures the time characteristics by starting a time monitoring that determines a time interval between the points of time $t_a$ and $t_b$ and by shifting the second instance of the response into the transmit buffer (84) only if the time interval exceeds a defined minimum value.

According to this embodiment, the reply can thus also be sent redundantly.

According to a further refinement, the control device has the following further feature: The second control module ensures the time characteristics by starting a time monitor that determines a time interval between reception of a first instance of the process data and reception of a second instance of the process data only when the second control module receives a first instance of the process data.

According to this refinement, the second control module has a further time monitoring device, which may be designed independently of a time monitoring device of a first control module. By the second control module starting this time monitoring only when it has received a first instance of the process data, the second control module is enabled in interaction with a correspondingly designed first control module to guarantee a minimum time interval (minimum duration $\Delta 1$ or 43) between the creation of the process data and the processing of the process data on different control modules without the different control modules being safety-related synchronized in time. In this case, the first control module can also be designed analogously if it is a receiver of the process data.

The response to the transmitted process data can thus also be transmitted in the previously described manner. Therefore, according to a further refinement, the control device may have the following further features: The first control module ensures the time characteristics by starting a time monitor that determines a time interval between reception of a first instance of the response and reception of a second instance of the response only when the first control module receives a first instance of the response.

According to a further refinement, the control device has the following further feature: The first instance of the process data and the second instance of the process data are redundant data telegrams of the process data; and the first control module provides the first instance of the process data and the second instance of the process data with consecutive instance numbers.

Further, according to another refinement: The first instance of the response and the second instance of the response are redundant data telegrams of the response; and the second control module provides the first instance of the response and the second instance of the response with consecutive instance numbers.

According to these refinements, an instance number is introduced for the transmission of the redundant data packets. The instance number refers to the redundant instances or redundant packets of a specific process data object of the process data that is transmitted redundantly. The instance number is used to make the instances distinguishable and sortable. By using instance numbers, a control module can easily assess whether process data of a first instance or a subsequent instance has been received. It is understood that the invention is not limited to a first and second instance, but three or more instances can be transmitted, which are used in pairs or as a whole to ensure the minimum intervals.

According to a further refinement, the control device has the following further features: The second control module starts time monitoring at the second time $t_2$, which determines a time interval to the third time $t_3$; and the second control module does generate the response at the third time $t_3$ only after the second minimum duration $\Delta 2$ has elapsed.

According to this refinement, the second control module can easily guarantee the second minimum duration $\Delta 2$. For this purpose, it is sufficient that the second control module monitors the time interval between two events that are within the sphere of influence of the second control module. A time monitoring of this period can thus be realized particularly easily and independently of other modules. The embodiment further contributes to ensure a defined time characteristic in an easy manner.

According to a further refinement, the control device has the following further feature: The first control module sends and receives the process data cyclically, monitors a number of cycles between the first time $t_1$ and the fourth time $t_4$ as a round-trip time, and triggers a safety-related action if the round-trip time exceeds a defined value.

The first control module can thus monitor a round-trip time and trigger a corresponding safety-related reaction if the process data is not processed within a defined round-trip time.

According to a further refinement, the control device has the following further features: The first control module processes the process data according to a first local cycle; the second control module processes the process data according to a second local cycle; the first local cycle and the second local cycle have the same period; and the first minimum duration $\Delta 1$, the second minimum duration $\Delta 2$ and the third minimum duration $\Delta 3$ are each shorter than the period.

According to this refinement, the minimum durations $\Delta 1$, $\Delta 2$ and $\Delta 3$ are each smaller than the period of the respective processing cycles and can thus be easily integrated into the processing cycles as fixed time characteristics.

According to a further refinement, the control device has the following further feature: The first control module sends a first instance and at least a second instance of the process data to the second control module within the first local cycle.

According to this refinement, the first control module transmits the process data at least twice within a single local cycle. Thereby, a minimum interval can be easily realized together with a receiving module.

According to a further refinement, the control device has the following further feature: The second control module sends a first instance and at least a second instance of the response to the process data to the first control module within the second local cycle.

According to this refinement, the second control module also transmits the response at least twice within a single local cycle. Thereby, a minimum interval can be easily realized together with a first control module as receiving module.

According to a further refinement, the control device has the following further feature: The first control module and the second control module each have a fail-safe implemented processing unit that enables fail-safe execution of a user program and/or fail-safe input/output of the process data.

The fail-safe implemented processing unit may be, for example, an IEC61131 PLC resource of a head module of the control device enabling fail-safe execution of a user-generated user program. For input/output modules, the fail-safe implemented processing unit can ensure fail-safe input and output of process data.

According to a further refinement, the control device has the following further feature: Each fail-safe implemented processing unit is configured to ensure fail-safe communication over the communication channel regardless of the design of the communication channel.

According to this refinement, the first control module and the second control module are configured to enable fail-safe communication via a non-fail-safe communication channel (black channel principle). At the same time, the measures for ensuring the defined time characteristics, as described above, can also be used when applying this principle.

According to a further refinement, the control device has the following further feature: Each fail-safe implemented processing unit is configured to provide fail-safe time monitoring on the respective first and second control module.

According to this refinement, the control modules can provide fail-safe time monitoring, for example, by redundantly performing time monitoring by two separate processing units that compare and monitor each other's results. The defined time characteristic can thus be provided in a simple manner.

It goes without saying that the features mentioned above and those to be explained below can be used not only in the combination indicated in each case, but also in other combinations or on their own, without leaving the scope of the present invention.

BRIEF DESCRIPTION OF THE DRAWINGS

Embodiments of the invention are shown in the drawings and are explained in more detail in the following description.

DETAILED DESCRIPTION

Figure 1:
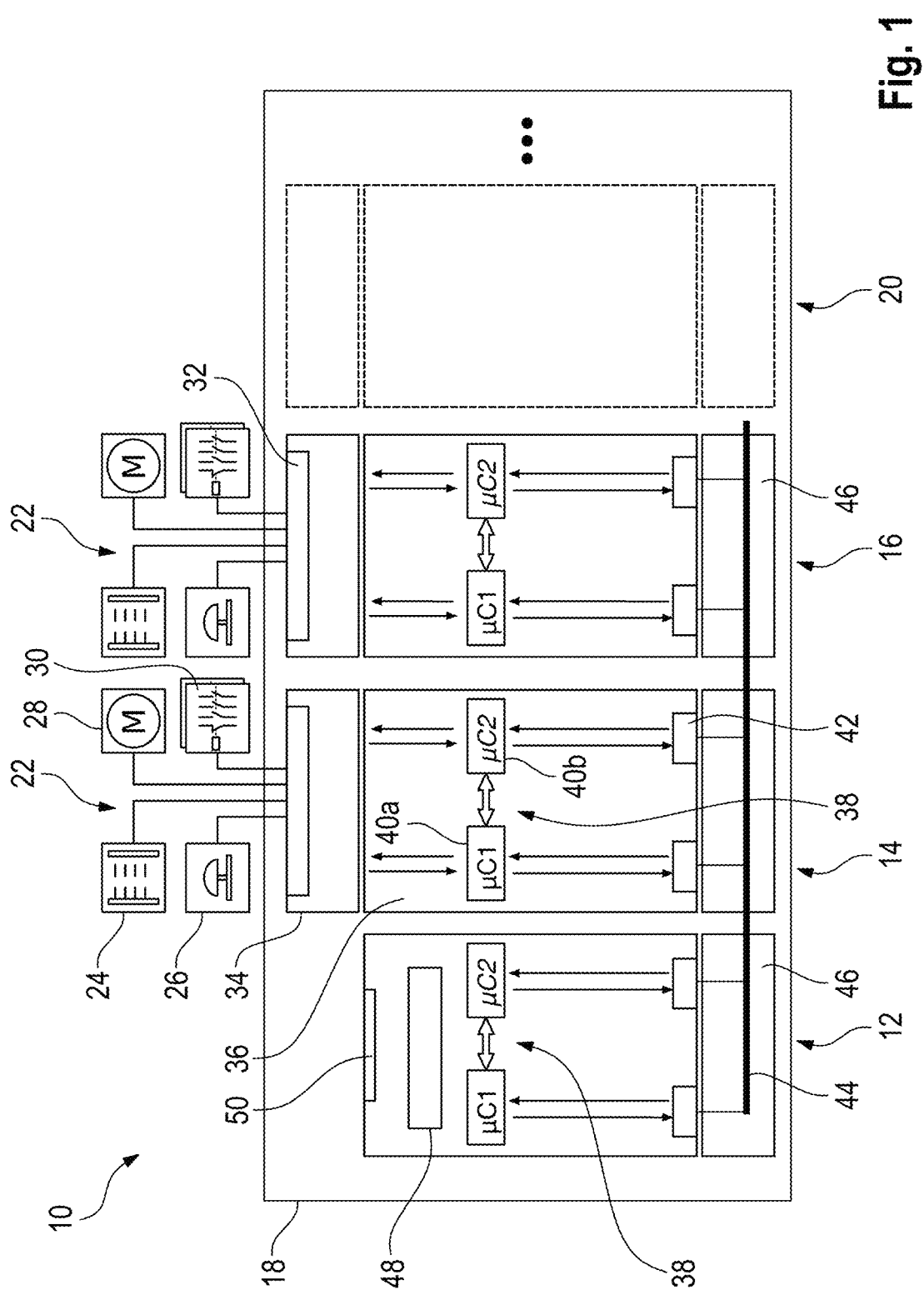
FIG. 1 is a schematic representation of an embodiment of a control device having a first control module and a second control module.

FIG. 1 shows a schematic representation of a control device according to an embodiment of the present invention. The control device in its entirety is designated here by reference numeral 10.

The control device 10 is a modular control device comprising three individual modules in the embodiment shown here. A first control module 12 is a central processing unit of the control device 10 (head module). A second control module 14 and a third control module 16 are input/output modules via which the control device 10 is connected to a technical system.

The modules 12-16 are individual assemblies that are arranged together in a housing 18 or a housing frame. Typically, the modules are individual units that are plugged together to form the control device 10. Thereby, the control device 10 can be individually assembled and adapted to a respective control and regulation task. The expandability is indicated here by another module slot 20 as a placeholder for additional modules. Thus, the control device 10 is not limited to the number of modules shown here but may be expanded by additional modules.

Usually, a control device 10 of this type is housed in a control cabinet (not shown here) and the input/output modules 14, 16 are connected directly or indirectly (for example, via a field bus) to the periphery 22 of the technical system. The periphery may include input devices, such as light barriers 24 or emergency stop buttons 26, and output devices that function as actuators. Actuators can be, for example, motors 28 or contactors 30. It is understood that the invention is not limited to specific peripheral elements shown here.

In the present embodiment, the second control module 14 and the third control module 16 have connections to input devices and output devices, respectively. In other words, here both control modules 14, 16 have respective inputs and outputs 32 through which the modules are connected to the periphery 22. It is understood that in other embodiments a control module may have only inputs or only outputs. The inputs and outputs 32 of the modules can be arranged in a separate module part (connection module part 34).

Processing of the input and output signals applied to the inputs and outputs 32 is performed in a logic module part 36 of the control modules. In various embodiments, the logic module part 36 includes a fail-safe processing unit 38 comprising, for example, two separate processing units 40a and 40b. The processing units 40a, 40b may be microcontrollers, ASICs, or FPGAs, and can be of diverse types. In addition, the logic module part 36 has an interface 42 to a communication bus 44. Like the processing units 40a, 40b, the interface 42 may be redundant. In principle, the control modules 12-16 have a fail-safe design in the sense of SIL2 or higher according to EN 61508 and/or PL d or higher according to ISO 13849-1.

The communication bus 44 enables the control modules of the control device 10 to establish a communication channel with each other. In particular, the control modules 14, 16, which function as input/output modules, may communicate with the head module via the communication bus 44. The communication bus 44 may be formed by bus module parts 46 that belong to the individual control modules 12-16. The bus module parts 46 arranged in a row may form a so-called modular backplane. Alternatively, the communication bus 44 may also be formed by a fixed rear panel of the housing 18 of the control device 10.

The first control module 12, which functions as the head module in the present embodiment, has a similar logic module part 36 as the input/output modules. The fail-safe implemented processing unit 38 of the head module is configured to process a user program. The user program may be stored, for example, in a memory 48 of the logic module part 36. The user program can be processed according to the input-process-output (IPO) principle. In a first step, the fail-safe implemented processing unit 38 generates a process image of the inputs (PII) and then sequentially executes instructions of the user program based on the PII. Finally, the fail-safe implemented processing unit 38 of the head module writes a process image of the outputs (PIO), based on which the outputs are controlled.

The inputs are read in via the input modules and the outputs are set via the output modules. For the input/output modules, the fail-safe implemented processing unit 38 is configured to provide input and output in a fail-safe manner. The communication between the modules is realized by the communication bus 44. Thus, in the present embodiment, the first control module 12 is not directly provided with inputs and outputs 32 to the periphery and can therefore do without its own connection module part 34. However, the first control module 12 may have an additional interface 50 that can be used to establish a connection to other control devices or diagnostic equipment.

Figure 2:
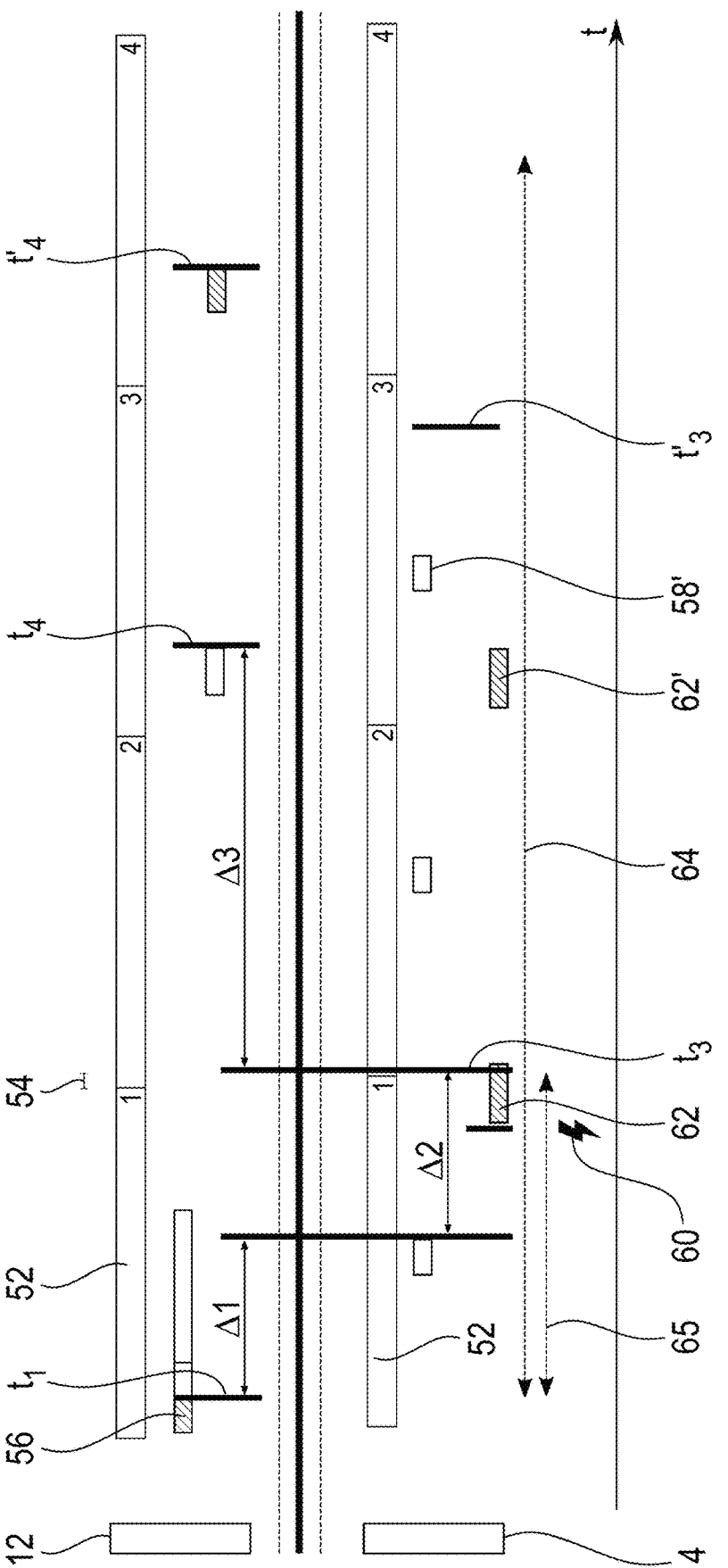
FIG. 2 is a schematic representation of a communication between two control modules according to a first aspect.

Using FIG. 2 as an example, the communication between two control modules is explained below. FIG. 2 shows in a schematic representation an example of the transmission of a process image of the inputs between a head module (first control module 12) and an input/output module (second control module 14) via the communication bus 44. Specifically, FIG. 2 represents a worst-case analysis of a fail-safe transmission of a PII (FS-PII).

In the diagram according to FIG. 2, the time t is plotted in the longitudinal direction. The first control module 12 (top) and the second control module 14 (bottom) operate with fixed local cycles 52 having defined cycle times. The cycle time is the time for processing a cycle including all communication tasks. "Local" in this context means that the cycles of the first control module 12 and the second control module 14 do not necessarily have to be synchronized. Specifically, the cycles do not have to be synchronized in a functionally safe manner. In other words, the cycles may be regularly synchronized, but this need not necessarily be done in a fail-safe manner in order to perform the method according to the present disclosure. Generally, it is assumed that there is a certain time offset 54 between the local cycles 52 of the individual control modules 12, 14.

The control module 12 creates a process data frame and prepares it for transmission, as indicated here by reference numeral 56. The process data frame is then moved to an output buffer of the communication channel provided by the communication bus 44 and is thus transferred to an area of responsibility of the communication bus 44 (time $t_1$). Subsequently, transmission via the communication bus 44 to the second control module 14 occurs. The reception of the data is indicated here by reference numeral 58. Time $t_2$ marks the start of the processing of the process data by the second control module 14, i.e., the reading of the process data from the received frame and its evaluation. The first control module 12 and the second control module 14 are jointly configured to ensure a minimum duration $\Delta1$ between the two times $t_1$ and $t_2$. This can be achieved, for example, by preparing and sending the process data from the control module 12 not just once within the local cycle, but twice. Such processing will be further explained in detail with reference to FIG. 5-7.

The second control module 14 generates a response to the received process data and places the response in an output buffer of the communication channel provided by the communication bus 44 at a time $t_3$. Creating the response includes reading the inputs of the second control module 14 and writing the appropriate states to the frame for dispatch. After being received by the first control module 12, the response is processed by the control module 12 at time $t_4$. The first control module 12 and the second control module 14 also guarantee a minimum duration $\Delta3$ between the two times $t_3$ and $t_4$ for the response. This can be achieved in the same way as for sending the process data, namely in that the response is prepared and sent by the second control module 14 several times (at least twice) within the local cycle of the second control module.

For a worst-case analysis, event 60 of FIG. 2 (shown here by the arrow) is analyzed in the following. The event 60 may be, for example, the actuation of an emergency stop button, which changes the state of an input of the second control module 14. For the present analysis, the event 60 is timed in such a way that processing (indicated here by reference numeral 62) of the event can just no longer be taken into account for the response at time $t_3$ and thus takes place completely in the subsequent cycle (reference numeral 62'). This assumption is permissible, since it is required that a signal must be present at the inputs for at least two local cycle times. Thus, in the present case, the event 60 is not considered until the subsequent cycle, and the corresponding state of the input is stored and sent in the response to the process data 58'. This response is then also transmitted to the first control module 12 and processed by it at time $t'_4$.

In the worst-case analysis of the FS-PII transmission time, the time duration from the occurrence of the event 60 to the (guaranteed) processing by the first control module 12 is considered. Taking redundant transmission into account, the latter time is here time $t'_4$. Without additional ensured time characteristics of transmission or processing, the entire round-trip 64 from time $t_1$ to time $t'_4$ is to be used for the worst-case analysis.

For a more favorable worst-case analysis, the control modules 12, 14, as described previously, are configured to guarantee certain minimum intervals (minimum durations) between individual operations either jointly or individually. In the present case, the first control module 12 and the second control module 14 are configured to ensure jointly a minimum duration $\Delta1$ between time $t_1$ and time $t_2$, and a minimum duration $\Delta3$ between time $t_3$ and time $t_4$ (or $t'_3$ and $t'_4$). Furthermore, the second control module 14 can ensure a minimum duration $\Delta2$ between the time $t_2$ and the time $t_3$ by itself.

By setting the minimum intervals as described above, additional time characteristics of transmission and processing are known and guaranteed so that they can be considered in the worst-case analysis. In the present case, this means that a period 65 (time $t_1$ to time $t_3$) can be disregarded in the analysis, since this period is needed at least until the response is generated and is therefore fixed. One way to guarantee these minimum intervals by transmitting the process data multiple times is explained in more detail with reference to FIG. 5-7.

Before this, however, an example of the transmission of a process image of the outputs PIO (FS-PIO) between the head module (first control module 12) and the input/output module (second control module 14) is described with reference to FIG. 3. As in FIG. 2, the diagram in FIG. 3 also shows the time t plotted in the longitudinal direction. Analogous to FIG. 2, the control module 12 creates a process data frame and prepares it for transmission, as indicated here by reference numeral 66. The process data frame is then moved to an output buffer of the communication channel provided by the communication bus 44 and is thus transferred to an area of responsibility of the communication bus 44 (time $t_1$).

After reception 68 of the process data by the second control module 14, the second control module 14 starts processing the process data at the second time $t_2$. The output generated at the outputs is indicated by reference numeral 70. Following the output 70, the desired state 72, such as a stop of the machine, is assumed by the machine. At the third time $t_3$, the second control module 14 generates a corresponding response and prepares it for transmission 74. After reception 76 of the response by the first control module 12, the response is evaluated at the fourth time $t_4$.

For the worst-case analysis of the FS-PIO transmission duration, the duration from the sending of the process data to the reception of the corresponding response is relevant, provided that no other time characteristics can be ensured. In other words, the entire round-trip 78 is initially relevant for the analysis here.

For a more favorable worst-case analysis, minimum intervals between individual operations should also be guaranteed here. The second minimum duration $\Delta2$ between the second time $t_2$ and the third time $t_3$ corresponds to the second minimum duration $\Delta2$ previously indicated with reference to FIG. 2. Furthermore, a third minimum duration $\Delta3$ can be guaranteed by the interaction of the first control module 12 and the second control module 14. The third minimum duration $\Delta3$ relates to a time span between the third time $t_3$ and the fourth time $t_4$.

As before, by guaranteeing these minimum intervals, a more favorable worst-case analysis can be achieved with respect to the transmission of the process image of the outputs. Due to these ensured time characteristics, a time span 79 starting from the second time $t_2$ to the fourth time $t_4$ can be disregarded in the analysis.

Having shown above the beneficial effects of the minimum intervals for worst-case analysis for the transmission duration of PII and PIO, it will be shown in the following how the control modules can be configured to ensure the minimum intervals.

As shown above, three minimum intervals $\Delta1$, $\Delta2$, and $\Delta3$ are relevant. The minimum duration $\Delta2$ can be ensured by a single control module. The minimum duration $\Delta1$ and the minimum duration $\Delta3$, on the other hand, can only be ensured by the interaction of two modules. The latter can make use of redundant (multiple) transmission of process data to guarantee the minimum intervals. In the following, with reference to FIG. 4, it will be discussed how the minimum duration $\Delta2$ can be guaranteed by a single control module.

Figure 3:
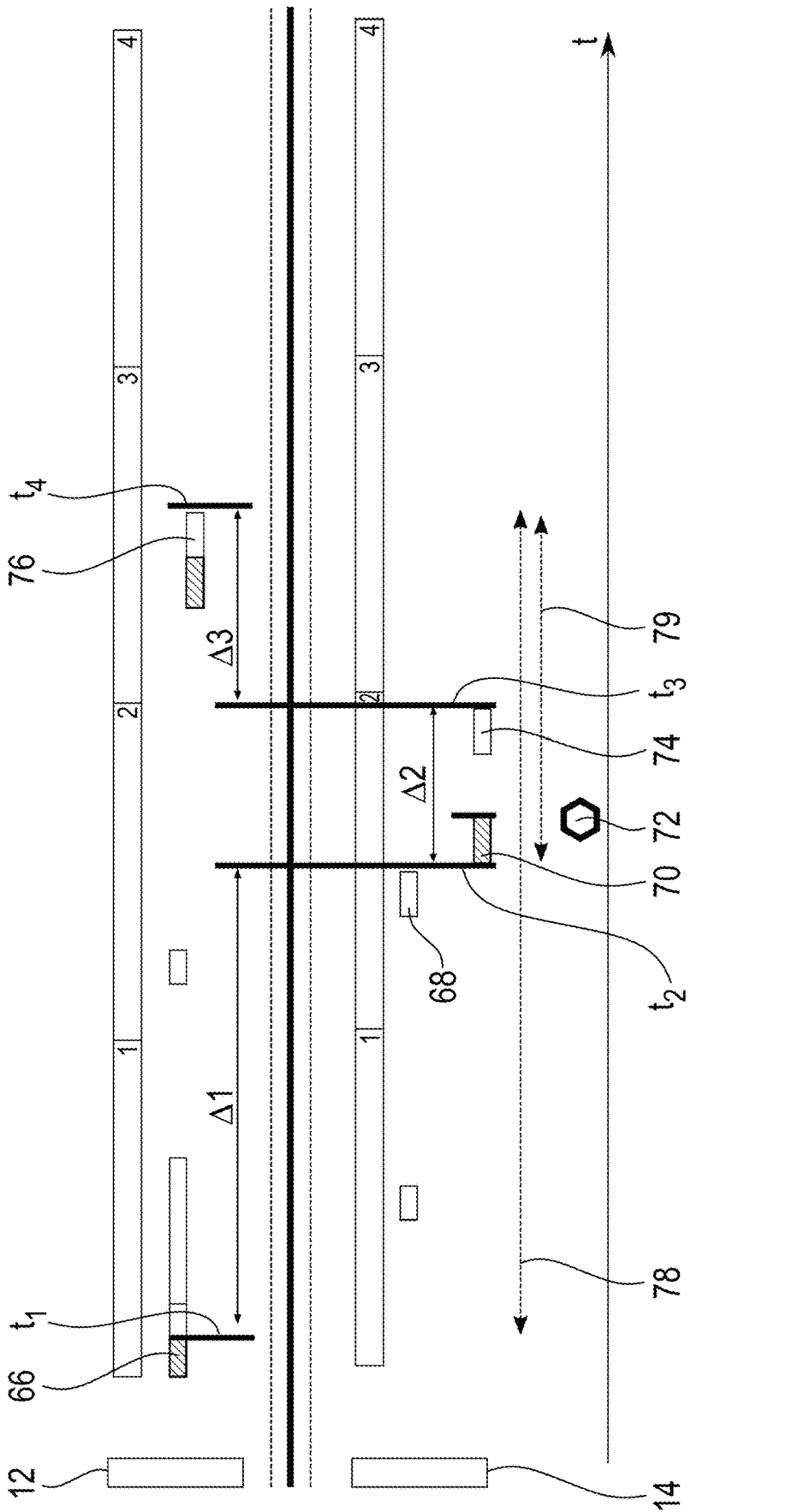
FIG. 3 is a schematic representation of a communication between two control modules according to a second aspect.
Figure 4:
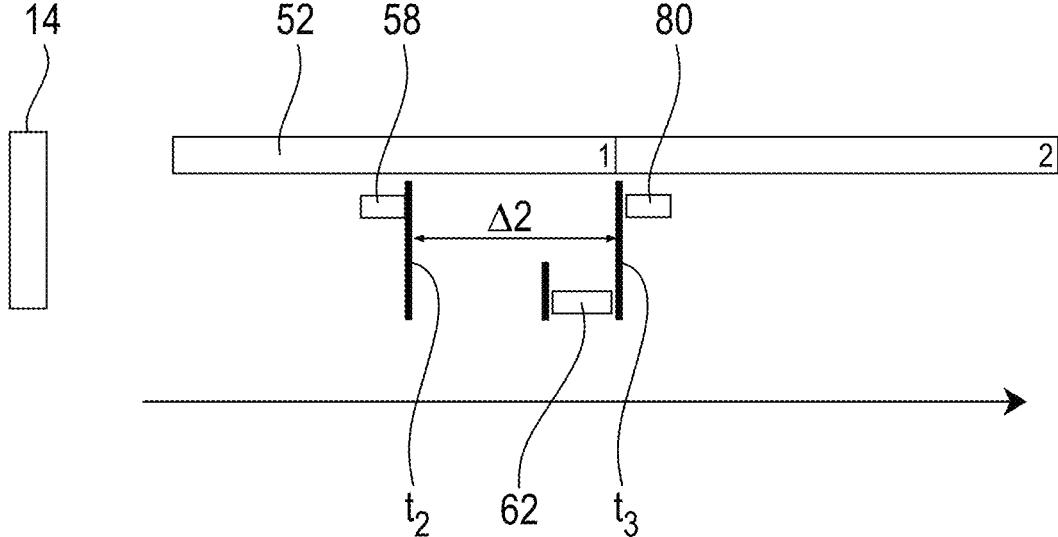
FIG. 4 is a schematic representation of data processing within a control module according to a third aspect

FIG. 4 is a detail of FIG. 2 or 3 showing only the second control module 14. The same reference signs denote the same parts as in FIG. 2 and FIG. 3.

The detail shows two local cycles 52 of the second control module 14. As described above, after receiving process data from another control module, the second control module 14 processes the data starting at time $t_2$. At the same time, the control module 14 starts a timer for time monitoring. By means of the time monitoring, a time period is defined within which the control module 14 prevents a transmission of the process data (i.e., the response to the received process data). Only after the specified time period has elapsed, the control module 14 will be able to generate and send a response back to the other control module. The period during which the second control module 14 is prevented from sending the response corresponds to the second minimum duration $\Delta2$.

Time monitoring can be achieved with a timer having a fixed duration. Such a timer can be easily implemented by the fail-safe implemented processing unit 38 provided in the control module. In this regard, the redundant design of the fail-safe implemented processing unit 38 also allows the timer to be set up in a fail-safe manner. For example, each processing unit of the second control module may execute a timer, respectively, to ensure the minimum duration. Timers are usually already integrated in common microcontrollers or can be easily emulated in software. Thus, no additional hardware is required for the implementation of time monitoring, so that it can also be retrofitted to existing control modules by a software update.

Figure 5:
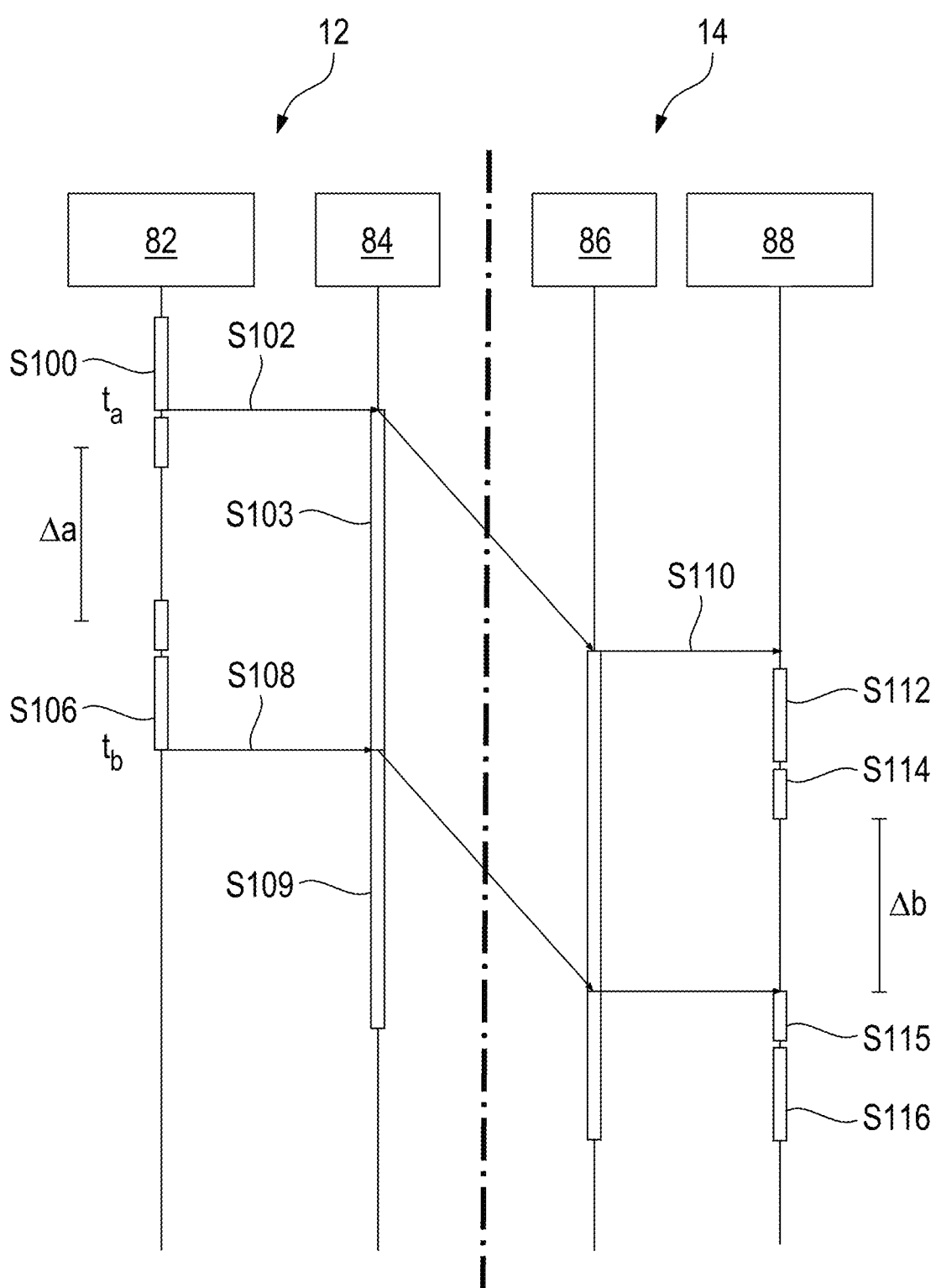
FIG. 5 is a sequence diagram of a redundant transmission of process data of a first instance and a second instance.
Figure 6:
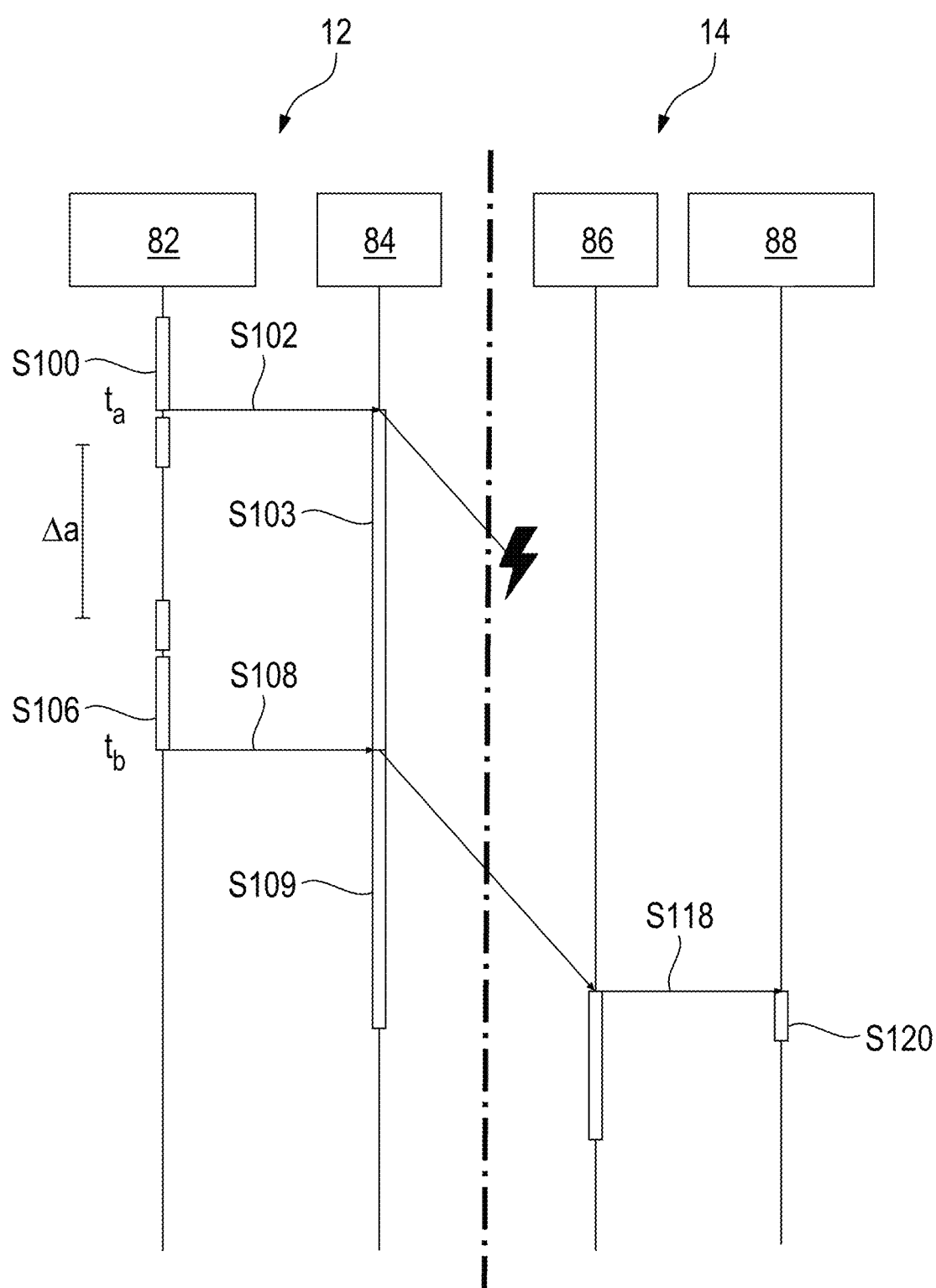
FIG. 6 is a sequence diagram of the redundant transmission according to FIG. 5 in case the process data of the first instance is lost
Figure 7:
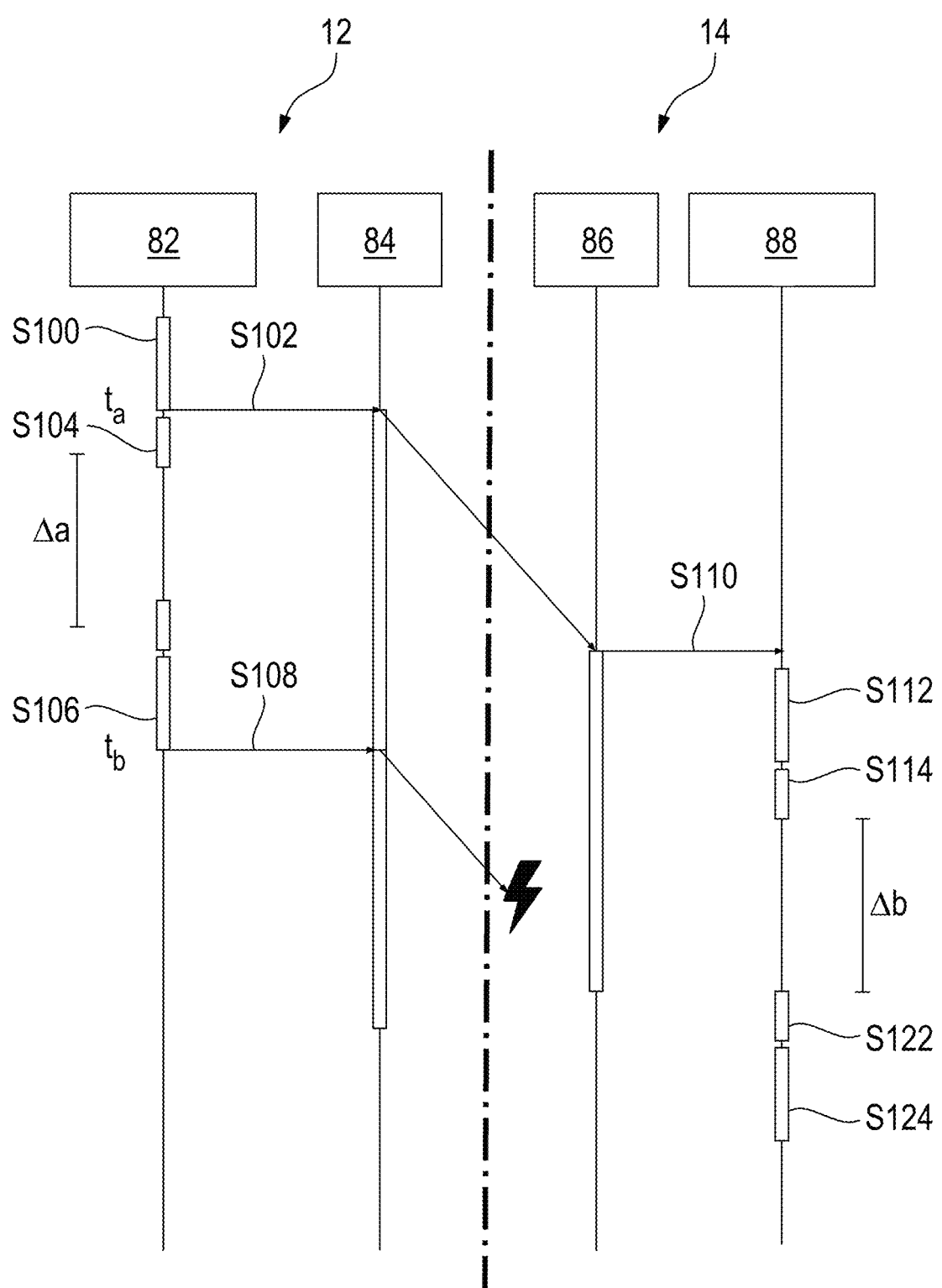
FIG. 7 is a sequence diagram of the redundant transmission according to FIG. 5 in case the process data of the second instance is lost.

With reference to FIGS. 5 to 7, it will be described in the following how two control modules can interact to ensure minimum intervals between individual operations/events. One possibility is to send the process data multiple times within the cycle time, so that a first instance and at least a second instance of the process data are always transmitted in a single cycle.

In order to make these instances recognizable, distinguishable and sortable, the control modules can be configured to provide the redundant instances, i.e., the redundant packets of a particular process data object (PDO), with consecutive instance numbers. The instance numbers serve to make the redundant instances distinguishable and can consequently be an addition to an already existing sequence numbering of the process data. It is understood that other measures may be taken to achieve this distinctiveness.

With the help of the distinguishability of the individual instances and by taking advantage of redundant transmission, a minimum duration can be guaranteed between the creation of the process data on one control module and its processing on another control module, as will be explained in more detail below.

FIG. 5 shows a sequence diagram of the transmission of redundant process data from a first control module 12 to a second control module 14. The control module 12 includes a fail-safe process image generator 82 and a transmit buffer 84. The control module 14 includes a receive buffer 86 and a fail-safe process image consumer 88. The process image generator 82 generates a process image for transmission, while the process image consumer 88 evaluates a received process image. The process image generator 82 and the process image consumer 88 are fail-safe devices. On the other hand, the transmit buffer 84 and the receive buffer 86 may be non-fail-safe devices (also referred to as standard devices) of a communication bus.

It is understood that the control module 12 may include a receive buffer and a process image consumer, analogous to the control module 14. Similarly, the control module 14 may include a transmit buffer and a process image generator. In this way, a two-way communication between the two modules can be realized. However, for the sake of simplicity, these components have been omitted here.

FIG. 5 shows the redundant transmission of a first instance and a second instance of process data. More specifically, FIG. 5 shows the transmission of a first-instance process data object (FS-PDO instance 1) followed by a transmission of a second-instance process data object (FS-PDO instance 2). The first process data object and the second process data object have the same control-relevant content, but are distinguished by the instance numbering described above.

In the following, it will be explained how a minimum time interval can be maintained in such a transmission (cf. FIGS. 2 and 3: minimum duration $\Delta1$ and minimum duration $\Delta3$). FIG. 5 shows the case in which all process data objects arrive at the receiver (second control module 14) and none of the redundant process data objects is lost.

In a step S100, the fail-safe process image generator 82 creates a first-instance process data object and stores the object in the transmit buffer at a time $t_a$ in the step S102. Subsequently, the process data object is in the send buffer 84 (S103) and can be sent via the communication bus 44. From this point on, the fail-safe process image generator 82 can no longer influence when and how the process data object is sent over the communication bus 44. Accordingly, after storing the process data object of the first instance (FS-PDO instance 1) in the transmit buffer 84, the first control module 12 starts a time monitoring to ensure a minimum interval for the creation of the second process data object (FS-PDO instance 2). Time monitoring can be implemented by a timer set to a defined period of time (timer runtime). In addition, the first control module 12 is configured not to create another process data object or to move such an object into the transmit buffer if the defined time period has not yet expired.

Thus, the second-instance process data object is placed in the transmit buffer 84 only after the timer has expired, i.e., when no time underrun has been detected. The second-instance process data object can also be created only after the timer has expired (S106).

The second-instance process data object is thus placed in the transmit buffer 84 while maintaining a minimum interval in step S108 and is then ready for transmission (S109). The first control module 12 thus guarantees that a minimum interval Δa is maintained between the creation of the first-instance process data object and the creation of the second-instance process data object.

If none of the process data objects are lost during transmission, the second control module 14 first receives the first-instance process data object stored in the receive buffer 86, which is read by the process image consumer 88 in step S110. Subsequently, the process data object is evaluated in step S112.

The second control module 14 then starts time monitoring to ensure the minimum interval for processing and evaluation of a second-instance process data object (S114). The time monitoring can be configured analogous to the time monitoring of the first control module, whereby during the timer runtime not the sending of a process data object is prevented, but its processing and evaluation. This can be achieved by the second control module 14 being configured to read out a second-instance process data object located in the receive buffer 86, but to execute processing and evaluation of this object only if no time underrun has been detected and thus a minimum interval Δb can be ensured. In other words, an evaluation of the process data object of the second instance is performed conditionally in step S116, depending on whether the timer has been terminated (S115).

By having the two control modules 12, 14 each guarantee the minimum intervals Δa and Δb, it is possible for the process image generator 82 in the first control module 12 and the process image consumer 88 in the second control module 14 to jointly ensure that there is a minimum time interval between the creation (S100) and processing (S116) of the process data. This minimum time interval corresponds to the minimum durations Δ1 and Δ3 as described with reference to FIGS. 2 and 3. Taking advantage of redundant transmission, the required minimum duration (minimum durations Δ1 and Δ3) can thus be easily ensured by ensuring defined time spans between operations within the individual control modules.

As will be shown in the following, these minimum durations can also be guaranteed even if one of the two process data objects should be lost. FIG. 6 depicts a case in which the first-instance process data object is lost during transmission. FIG. 7 subsequently shows the case in which the second-instance process data object does not reach its destination.

In FIGS. 6 and 7, the operations in the first control module 12 are the same as in the first control module 12 according to FIG. 5, and the first control module 12 transmits the redundant process data in accordance with the previously mentioned steps S100 to S108. Accordingly, a renewed description of these steps is omitted.

However, in contrast to FIG. 5, the transmission of the first-instance process data object (FS-PDO instance 1) is lost in the case according to FIG. 6. Thus, the first-instance process data object does not reach the receive buffer 86 of the second control module 14, or the process image consumer 88 cannot read the first-instance process data object from the receive buffer 86. In this case, the first-instance process data object is not processed and evaluated by the process image consumer 88. Likewise, no time monitoring is started. Meanwhile, the second control module 14 receives the second-instance process data object. The second-instance process data object is read out by the process image consumer 88 in step S118 and processed directly in step S120. Since the process image consumer 88 recognizes that it is processing a second-instance process data object, no time monitoring is started.

According to this processing, even in the case when the first-instance process data object is lost, the minimum time interval between the creation and processing can be guaranteed.

The same results for the case if the second-instance process data object is lost. This case is depicted in FIG. 7. Again, the steps performed by the first control module 12 are initially identical to those of the first control module 12 of FIG. 5.

The second control module 14 thus receives the first-instance process data object and executes steps S110 to S114 as already described with reference to FIG. 5. Accordingly, the process image consumer 88 starts time monitoring (S114) after evaluating the process data object of the first instance (S112), but then does not receive another process data object (S122) after the specified time period has elapsed. Thus, the process image consumer 88 re-evaluates the process data object of the first instance after the time monitoring has expired in order to complete the process data evaluation (S124). Since the renewed evaluation of the process data object of the first instance is also delayed by the minimum time interval Δb, the minimum interval between the creation of the process data (S100) and the final evaluation (S124) of the process data is again ensured.

It is understood that the above-mentioned possibility for establishing minimum intervals between transmissions are only to be understood as examples and that other variants are conceivable for this purpose. Thus, the subject matter of the present disclosure is not limited by the present description. Rather, the subject matter of the invention is defined exclusively by the following claims.

The phrase at least one of A, B, and C should be construed to mean a logical (A OR B OR C), using a non-exclusive logical OR, and should not be construed to mean "at least one of A, at least one of B, and at least one of C."

What is claimed is:

1. A control device for controlling an automated system, the control device comprising:

a first control module;

a second control module; and a communication channel via which the first control module and the second control module are configured to exchange process data of the automated system, wherein:

the first control module is configured to generate process data at a first time $t_1$, send the process data to the second control module via the communication channel, receive a response to the process data from the second control module, and process the process data at a fourth time $t_4$;

the second control module is configured to receive the process data from the first control module, process the process data at a second time $t_2$, generate the response at a third time $t_3$, and send the response to the first control module;

the times $t_1$, $t_2$, $t_3$, and $t_4$ are in chronological order, the first control module and the second control module are jointly configured to guarantee at least one of: a first minimum duration Δ1 between the first time $t_1$ and the second time $t_2$, or a second minimum duration $\Delta 2$ between the third time $t_3$ and the fourth time $t_4$, by transmitting the process data redundantly and ensuring specific time characteristics;

the first control module is configured to transmit the process data redundantly by shifting a first instance of the process data into a transmit buffer of the communication channel at a first point of time $t_a$ and by shifting a second instance of the process data into the transmit buffer of the communication channel at a second point of time $t_b$; and the first control module is configured to ensure the specific time characteristics by starting a first time monitoring, which determines a first time interval between the points of time $t_a$ and $t_b$, and by shifting the second instance of the process data into the transmit buffer only in case the determined first time interval exceeds a defined minimum value.

2. The control device of claim 1 wherein the second control module ensures the specific time characteristics by starting a third time monitoring, which determines a time interval between reception of the first instance of the process data and reception of the second instance of the process data, only in case the second control module receives the first instance of the process data.

3. The control device of claim 1 wherein:

the first instance of the process data and the second instance of the process data are redundant data telegrams of the process data; and the first control module provides the first instance of the process data and the second instance of the process data with consecutive instance numbers.

4. The control device of claim 1 wherein the first control module sends and receives the process data cyclically, monitors a number of cycles between the first time $t_1$ and the fourth time $t_4$ as a round-trip time and triggers a safety-related action in case the round-trip time exceeds a defined value.

5. The control device of claim 1 wherein:

the first control module processes the process data according to a first local cycle;

the second control module processes the process data according to a second local cycle;

the first local cycle and the second local cycle have the same period; and the first minimum duration $\Delta 1$ and the second minimum duration $\Delta_2$ are each shorter than the period.

6. The control device of claim 5 wherein the first control module sends the first instance and at least the second instance of the process data to the second control module within the first local cycle.

7. The control device of claim 1 wherein the first control module and the second control module each have a fail-safe implemented processing unit that enables at least one of a fail-safe execution of a user program and a fail-safe input/output of the process data.

8. The control device of claim 7 wherein each fail-safe implemented processing unit is configured to ensure a fail-safe communication via the communication channel independent of a design of the communication channel.

9. The control device of claim 7 wherein each fail-safe implemented processing unit is configured to provide fail-safe time monitoring on the respective first control module and the second control module.

10. A control device for controlling an automated system, the control device comprising:

a first control module;

a second control module; and a communication channel via which the first control module and the second control module are configured to exchange process data of the automated system, wherein:

the first control module is configured to generate process data at a first time $t_1$, send the process data to the second control module via the communication channel, receive a response to the process data from the second control module, and process the process data at a fourth time $t_4$;

the second control module is configured to receive the process data from the first control module, process the process data at a second time $t_2$, generate the response at a third time $t_3$, and send the response to the first control module;

the times $t_1$, $t_2$, $t_3$, and $t_4$ are in chronological order, the first control module and the second control module are jointly configured to guarantee at least one of: a first minimum duration $\Delta 1$ between the first time $t_1$ and the second time $t_2$, or a second minimum duration $\Delta 2$ between the third time $t_3$ and the fourth time $t_4$, by transmitting the process data redundantly and ensuring specific time characteristics;

the second control module is configured to transmit the response to the process data redundantly by shifting a first instance of the response into a transmit buffer of the communication channel at a third point of time $t_a$ and by shifting a second instance of the response into the transmit buffer of the communication channel at a fourth point of time $t_b$; and the second control module is configured to ensure the specific time characteristics by starting a second time monitoring, which determines a second time interval between the points of time $t_a$ and $t_b$, and by shifting the second instance of the response into the transmit buffer only in case the determined second time interval exceeds a defined minimum value.

11. The control device of claim 10 wherein the first control module ensures the time characteristics by starting a fourth time monitor, which determines a time interval between reception of the first instance of the response and reception of the second instance of the response, only in case the first control module receives the first instance of the response.

12. The control device of claim 10 wherein:

the first instance of the response and the second instance of the response are redundant data telegrams of the response; and the second control module provides the first instance of the response and the second instance of the response with consecutive instance numbers.

13. The control device of claim 10 wherein:

the first control module is configured to process the process data according to a first local cycle;

the second control module is configured to process the process data according to a second local cycle;

the first local cycle and the second local cycle have the same period; and the first minimum duration $\Delta 1$ and the second minimum duration $\Delta 2$ are each shorter than the period.

14. The control device of claim 13 wherein the second control module is configured to send the first instance and at least the second instance of the response of the process data to the first control module within the second local cycle.

* * * * *